US006778957B2

(12) United States Patent
Wang et al.

(10) Patent No.: US 6,778,957 B2
(45) Date of Patent: Aug. 17, 2004

(54) METHOD AND APPARATUS FOR HANDSET DETECTION

(75) Inventors: Zhong-Hua Wang, White Plains, NY (US); David Lubensky, Danbury, CT (US); Cheng Wu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 09/934,157

(22) Filed: Aug. 21, 2001

(65) Prior Publication Data

US 2003/0065514 A1 Apr. 3, 2003

(51) Int. Cl.[7] .......................... G10L 15/10; G10L 15/20
(52) U.S. Cl. ...................... 704/233; 704/238; 704/239
(58) Field of Search .................... 704/231, 233, 704/236, 238, 239, 246

(56) References Cited

U.S. PATENT DOCUMENTS

| | | | | |
|---|---|---|---|---|
| 5,167,004 A | * | 11/1992 | Netsch et al. | 704/200 |
| 5,528,731 A | * | 6/1996 | Sachs et al. | 704/246 |
| 5,727,124 A | * | 3/1998 | Lee et al. | 704/233 |
| 5,765,124 A | * | 6/1998 | Rose et al. | 704/242 |
| 5,950,157 A | * | 9/1999 | Heck et al. | 704/234 |
| 5,960,397 A | * | 9/1999 | Rahim | 704/244 |
| 5,995,927 A | * | 11/1999 | Li | 704/246 |
| 6,151,573 A | * | 11/2000 | Gong | 704/256 |
| 6,263,309 B1 | * | 7/2001 | Nguyen et al. | 704/239 |
| 6,327,565 B1 | * | 12/2001 | Kuhn et al. | 704/255 |
| 6,449,594 B1 | * | 9/2002 | Hwang et al. | 704/233 |
| 6,615,172 B1 | * | 9/2003 | Bennett et al. | 704/257 |

OTHER PUBLICATIONS

Ivandro Sanches, "Noise–Compensated Hidden Markov Models", IEEE Transactions on Speech and Audio Processing, vol. 8, No. 5, Sep. 2000, pp. 533 to 540.*
Wang, Zhong–Hua, et al., *New Distance Measures for Text–Independent Speaker Identification*, International Conference for Spoken Language Processing (2000).
Sonmez, M.K., *Progressive Cepstral Normalization for Robust Speech Recognition/Speaker Identification*, Institute for Systems Research, Aug. 4, 1999.
Davis, Steven B., *Comparison of Parametric Representations for Monosyllabic Word Recognition in Continuously Spoken Sentences*, IEEE, 1980, pp. 65–74.
Gish, Herbert, *Robust Discrimination in Automatic Speaker Identification*, IEEE, 1990, pp. 289–292.
Soong, F.K., et al., *A Vector Quantization Approach to Speaker Recognition*, IEEE, 1985, pp. 387–390.

(List continued on next page.)

Primary Examiner—Richemond Dorvil
Assistant Examiner—Martin Lerner
(74) Attorney, Agent, or Firm—F. Chau & Associates, LLC; Thu A. Dang

(57) ABSTRACT

Disclosed is a method of automated handset identification, comprising receiving a sample speech input signal from a sample handset; deriving a cepstral covariance sample matrix from said first sample speech signal; calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

15 Claims, 1 Drawing Sheet

OTHER PUBLICATIONS

Rose, Richard C., et al., *Text–Independent Speaker Identification Using Automatic Acoustic Segmentation*, IEEE, 1990, pp. 293–296.

Reynolds, Douglas A., *HTIMIT and LLHDB: Speech Corpora for the Study of Handset Transducer Effects*, ICASSP, pp. 1535–1538 (May 1977).

Cohen, Arnon, et al., *On Text Independent Speaker Identification using a Quadratic Classifier with Optimal Features*, Speech Communication 8 (1989), pp. 35–44.

Sue Johnson, *Speaker Tracking*, Mphil Thesis, Jesus College, Aug. 1997, Cambridge University Engineering Department, Cambridge, England.

* cited by examiner

METHOD AND APPARATUS FOR HANDSET DETECTION

FIELD OF THE INVENTION

This invention relates to handset detection using cepstral covariance matrices and distance metrics.

BACKGROUND OF THE INVENTION

Automatic verification or identification of a person by their speech is attracting greater interest as an increasing number of business transactions are being performed over the phone, where automatic speaker identification is desired or required in many applications. In the past several decades, three techniques have been developed for speaker recognition, namely (1) Gaussian mixture model (GMM) methods, (2) vector quantization (VQ) methods, and (3) various distance measure methods. The invention is directed to the last class of techniques.

The performance of current automatic speech and speaker recognition technology is quite sensitive to certain adverse environmental conditions, such as background noise, channel distortions, speaker variations, and the like. The handset distortion is one of the main factors that contribute to degradation of the speech and speaker recognizer. In the current speech technology, the common way to remove handset distortion is the cepstral mean normalization, which is based on the assumption that handset distortion is linear, but in fact the distortion is not linear. This creates a problem in real-world applications because the handset used to record voice samples for identification purposes will more than likely be different than the type of handset used by the person we wish to identify, commonly referred to as a "cross-handset" identification problem.

When applied to cross-handset speaker identification using the Lincoln Laboratory Handset Database (LLHD), the cepstral mean normalization technique has an error rate in excess of about 20%. Consider that the error rate for same-handset speaker identification is only about 7%, and it can be seen that channel distortion caused by the handset is not linear. It is therefore desirable to remove the effects of these non-linear distortions, but before that's possible, it will first be necessary to identify the handsets.

SUMMARY OF THE INVENTION

Disclosed is a method of automated handset identification, comprising receiving a sample speech input signal from a sample handset; deriving a cepstral covariance sample matrix from said first sample speech signal; calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

In another aspect of the method, said distance metric is selected from $$d_1(S, \Sigma) = \frac{A}{H} - 1, \quad d_5(S, \Sigma) = A + \frac{1}{H} - 2,$$

$$d_6(S, \Sigma) = \left(A + \frac{1}{H}\right)\left(G + \frac{1}{G}\right) - 4, \quad d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1, \quad d_9(S, \Sigma) = \frac{A}{G} + \frac{G}{H} - 2,$$

an fusion derivatives thereof.

In another aspect of the method, said handset matrices are stored in a database of handset matrices wherein each handset matrix is derived from a unique make and model of handset.

In another aspect of the method, said different speakers number ten or more.

In another aspect of the method, said different speakers is no less than twenty.

Disclosed is a program storage device, readable by machine, tangibly embodying a program of instructions executable by the machine to perform method steps for automated handset identification, said method steps comprising receiving a sample speech input signal from a sample handset; deriving a cepstral covariance sample matrix from said first sample speech signal; calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

In another aspect of the invention, said distance metric is selected from $$d_1(S, \Sigma) = \frac{A}{H} - 1, \quad d_5(S, \Sigma) = A + \frac{1}{H} - 2,$$

$$d_6(S, \Sigma) = \left(A + \frac{1}{H}\right)\left(G + \frac{1}{G}\right) - 4, \quad d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1, \quad d_9(S, \Sigma) = \frac{A}{G} + \frac{G}{H} - 2,$$

and fusion derivatives thereof.

In another aspect of the invention, said handset matrices are stored in a database of handset matrices wherein each handset matrix is derived from a unique make and model of handset.

In another aspect of the invention, said different speakers number ten or more.

In another aspect of the invention, the number of said different speakers is no less than twenty.

Disclosed is an automated handset identification system, comprising means for receiving a sample speech input signal from a sample handset; means for deriving a cepstral covariance sample matrix from said first sample speech signal; means for calculating, with a distance metric, all distances between said sample matrix and one or more cepstral covariance handset matrices, wherein each said handset matrix is derived from a plurality of speech signals taken from different speakers through the same handset; and means for determining if the smallest of said distances is below a predetermined threshold value.

In another aspect of the invention, said means for receiving sample speech is in communication with an incoming line of communication.

In another aspect of the invention, said incoming line of communication is a phone line.

DETAILED DESCRIPTION OF PREFERRED EMBODIMENTS

Figure 1:
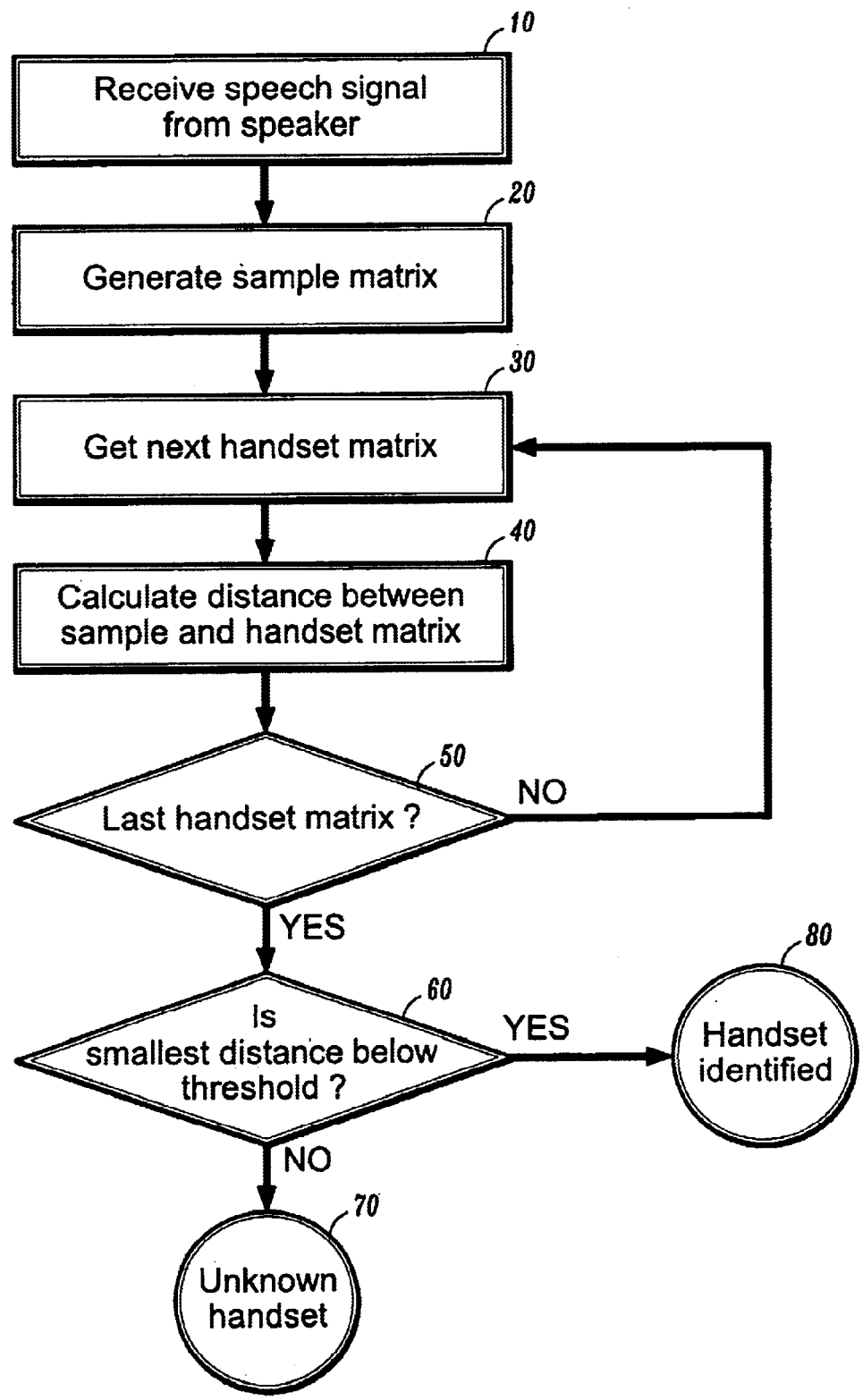
FIG. 1 is a flowchart of an embodiment of the invention.

Referring to FIG. 1, the process of the invention begins at node 10 wherein a speech signal is received from a speaker. The objective is to identify the handset, such as by make and model, through which the speaker is speaking.

Control now flows to node 20 wherein a cepstral covariant sample matrix S is generated from the received speech signal. The derivation may be by any one of a number of known methods such as those described in A. Cohen et al., *On text-independent speaker identification using automatic acoustic segmentation*, ICASSP, pp. 293–296,1985; and S. B. Davis et al., Comparison of parametric representations for monosyllabic word recognition in continuously spoken sentences, IEEE, 1980, the disclosures of both of which are incorporated by reference herein in their entirety.

The sample matrix comprises a plurality of cepstral vectors. Cepstral vectors are generally obtained by inputting the speech signal and dividing the signal into segments of, typically, 10 milliseconds each. A fast Fourier transform is then performed on each segment and the energy calculated for each of N frequency bands. The logarithm of the energy for each band is subject to a cosine transformation, thereby yielding a cepstral vector having N elements. The frequency bands are not usually equally spaced, but rather are scaled, such as mel-scaled, for example, as by the equation $mf=1125\log(0.0016f+1)$, where f is the frequency in Hertz and mf is the mel-scaled frequency.

Once a set of N cepstral vectors, c1, c2 . . . cN, has been obtained a covariance matrix may be derived by the equation:

$$S=[(c1-m)^T(c1-m)+(c2-m)^T(c2-m)+\ldots+(cN-m)^T(cN-m)]/N \quad (1)$$

where T indicates a transposed matrix, m is the mean vector $m=(c1+c2+\ldots+cK)/K$ where K is the number of frames in the speech signal, and S is the N×N covariance matrix.

Let S and S be covariance matrices of cepstral vectors of clips of testing and training speech signals, respectively, that is to say that S is matrix for the sample of speech that we wish to identify and S is a matrix for the voice signature of a known individual. If the sample and signature speech signals are identical, then S=S, which is to say that $S\ S^{-1}$ is an identity matrix, and the speaker is thereby identified as the known individual. Therefore, the matrix $S\ S^{-1}$ is a measure of the similarity of the two voice clips and is commonly referred to as the "similarity matrix" of the two speech signals.

The arithmetic, A, geometric, G, and harmonic, H, means of the eigenvalues $l(i=1,\ldots,N)$ of the similarity matrix are defined as follows:

$$A(\lambda_1,\ldots,\lambda_N) = \frac{1}{N}\sum_{i=1}^{N}\lambda_i = \frac{1}{N}Tr(S\Sigma^{-1}) \quad (2a)$$

$$G(\lambda_1,\ldots,\lambda_N) = \left(\prod_{i=1}^{N}\lambda_i\right)^{1/N} = (\text{Det}(S\Sigma^{-1}))^{1-N} \quad (2b)$$

$$H(\lambda_1,\ldots,\lambda_N) = N\sum_{i=1}^{N}\left(\frac{1}{\lambda_i}\right) = N(Tr(\Sigma S^{-1}))^{-1} \quad (2c)$$

where Tr( ) is the trace of a matrix and Det( ) is the determinant of a matrix.

These values can be obtained without explicit calculation of the eigenvalues and therefore are significantly efficient in computation. Also, they satisfy the following properties:

$$A\left(\frac{1}{\lambda_i},\ldots,\frac{1}{\lambda_N}\right) = \frac{1}{H(\lambda_1,\ldots,\lambda_N)} \quad (3a)$$

$$G\left(\frac{1}{\lambda_i},\ldots,\frac{1}{\lambda_N}\right) = \frac{1}{G(\lambda_1,\ldots,\lambda_N)} \quad (3b)$$

$$H\left(\frac{1}{\lambda_i},\ldots,\frac{1}{\lambda_N}\right) = \frac{1}{A(\lambda_1,\ldots,\lambda_N)} \quad (3c)$$

Various distance measures have been constructed based upon these mean values, primarily for purposes of speaker identification, the most widely known being:

$$d_1(S,\Sigma) = \frac{A}{H} - 1 \quad (4a)$$

$$d_2(S,\Sigma) = \frac{A}{G} - 1 \quad (4b)$$

$$d_3(S,\Sigma) = \frac{A^2}{GH} - 1 \quad (4c)$$

$$d_4(S,\Sigma) = A - \log(G) - 1 \quad (4d)$$

wherein if the similarity matrix is positive definite, the mean values satisfy the equation $A \geq G \geq H$ with equality if and only if $\lambda_1=\lambda_2=\ldots=\lambda_N$. Therefore, all the above distance measures satisfy the positivity condition. However, if we exchange S and S (or the position of sample and signature speech signals), $S\ S^{-} > SS^{-1}$ and $1_i > 1/1_i$, and find that $d_1$ satisfies the symmetric property while $d_2$, $d_3$, and $d_4$ do not. The symmetry property is a basic mathematic requirement of distance metrics, therefore $d_1$ is generally in more widespread use than the others.

Control now flows to node 30 where a cepstral covariance handset matrix M is retrieved from a database of such handset matrices, each handset matrix unique to a specific make and model of handset. The method of determining the test subject's handset will be by calculating the distances between the sample matrix and a database of handset matrices, each representative of a particular make and model of handset, in a manner analogous to that used for speaker identification. Hence M=S in Equations 1 through 4.

The generation of handset matrices is performed for a particular handset by having a substantial number of different speakers provide speech samples through the handset, preferably at least ten such samples, more preferably at least twenty. A cepstral covariance matrix is then generated for the handset from all the samples, thereby creating a handset matrix M. Because all the speakers are different, the speaker characteristics of the covariance matrix are smeared away, leaving only the handset information.

In a preferred embodiment, a database of handset matrices will be kept and updated periodically as new makes and models of handsets come on the market. It should be noted that "handset" is a term of convenience and is to be construed to cover any speech inputting microphone, whether handheld or not, such as, for example, the microphone on a video camera or tape recorder.

Control now flows to node 40 where the distance between the sample S and handset M matrices is calculated. Because speaker information has been smeared in the handset matrix, the distance between M and S will be a function of the difference in voice handset information rather than voice information. As stated above, there are four well known distance formulae in use as are described in H. Gish, *Robust discrimination in automatic speaker identification*, Proceedings ICASSP 1990, vol. 1, pp. 289–292; F. Bimbot et al., *Second-order statistical measures for test-independent speaker identification*, ECSA workshop on automatic speaker recognition, identification and verification, 1994, pp. 51–54; and S. Johnson, *Speaker tracking*, Mphil thesis, University of Cambridge, 1997, and references therein; the disclosures of all of which are incorporated by reference herein in their entirety. Of those, the first $d_1$ is the most favored for its symmetry and positivity. To this collection may be added five new inventive distance measures:

$$d_5(S, \Sigma) = A + \frac{1}{H} - 2 \quad (6a)$$

$$d_6(S, \Sigma) = \left(A + \frac{1}{H}\right)\left(G + \frac{1}{G}\right) - 4 \quad (6b)$$

$$d_7(S, \Sigma) = \frac{A}{2H}\left(G + \frac{1}{G}\right) - 1 \quad (6c)$$

$$d_8(S, \Sigma) = \frac{\left(A + \frac{1}{H}\right)}{\left(G + \frac{1}{G}\right)} - 1 \quad (6d)$$

$$d_9(S, \Sigma) = \frac{A}{G} + \frac{G}{H} - 2 \quad (6e)$$

all of which satisfy the positivity and symmetry conditions. Along with $d_1$, these distance metrics may be fused in any combination as described in K. R. Farrell, *Discriminatory measures for speaker recognition*, Proceedings of Neural Networks for Signal Processing, 1995, and references therein, the disclosures of which are incorporated by reference herein in their entirety. The example at the end of this disclosure demonstrates how fusion is accomplished.

Control now flows through nodes 50 and 30 in a loop until the distances between the sample matrix S and every handset matrix M is calculated.

After all the handset matrices have been run through and distances calculated for all of them, control flows to node 60 where the smallest distance is examined to determine if it remains below a predetermined threshold value. If not, control flows to termination node 70, indicating that the handset component of the speech sample failed to match any of those in the handset database. If, however, the distance is below the chosen threshold, then control flows to termination node 80, indicating that the handset has been positively identified.

The method of the invention may be embodied in a software program on a computer-readable medium and rigged so that the handset identification process initiates as soon as a call comes in and the person on the line has spoken his first words.

EXAMPLE

An LLHDB (Lincoln Laboratory Handset Database) corpus (a collection of utterances) was used, such as is described in D. A. Reynolds, *HTIMIT and LLHDB: speech corpora for the study of handset transducer effects*, ICASSP, pp. 1535–1538, May 1977, Munich, Germany, the disclosures of which are incorporated by reference herein in their entirety. Twenty eight female and 24 male speakers were asked to speak ten sentences extracted from the TIMIT corpus and the so-called "rainbow passage" from the LLHDB corpus over nine handsets and a Sennheiser high-quality microphone. The average length of the spoken rainbow passages was 61 seconds. In this experiment, the rainbow passage was used for training, and the remaining utterances for testing. One handset chosen at random was designated "cb1" and another "cb2". These are the actual handsets used for same-handset and cross-handset testing. The rainbow passage was uttered by all speakers into each handset to create the handset matrices.

A 13 static mel-cepstra and a 13 delta mel-cepstra were calculated from a five frame interval. For each utterance, one full covariance matrix was calculated.

The distances between the handset matrices and the sample matrices were calculated and the error rates of identification tabulated, resulting in the data of Table II as follows:

TABLE II

| $d_1$ | $d_2$ | $d_3$ | $d_4$ | $d_5$ | $d_6$ | $d_7$ | $d_8$ | $d_9$ |
|---|---|---|---|---|---|---|---|---|
| 11.9% | 12.6% | 11.7% | 15% | 13.3% | 17.5% | 13.2% | 11.5% | 11.9% |

It can therefore be seen that the invention provides good handset identification performance with a variety of choices of symmetrical and positive distance metrics.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of automated handset identification, comprising:
    receiving a sample speech input signal from a sample handset;
    deriving a cepstral covariance sample matrix from said first sample speech signal;
    calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

2. The method of claim 1 wherein said distance metric satisfies symmetry and positivity conditions.

3. The method of claim 2 wherein said distance metric is selected from:

$$d_1(S, \Sigma) = \frac{A}{H} - 1, \quad d_5(S, \Sigma) = A + \frac{1}{H} - 2,$$

$$d_6(S, \Sigma) = \left(A + \frac{1}{H}\right)\left(G + \frac{1}{G}\right) - 4, \quad d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1, \quad d_9(S, \Sigma) = \frac{A}{G} + \frac{G}{H} - 2,$$

and fusion derivatives thereof.

4. The method of claim 1 wherein said handset matrices are stored in a database of handset matrices wherein each handset matrix is derived from a unique make and model of handset.

5. The method of claim 1 wherein said different speakers number ten or more.

6. The method of claim 5 wherein the number of said different speakers is no less than twenty.

7. A program storage device, readable by machine, tangibly embodying a program of instructions executable by the machine to perform method steps for automated handset identification, said method steps comprising:

receiving a sample speech input signal from a sample handset;

deriving a cepstral covariance sample matrix from said first sample speech signal; calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

8. The apparatus of claim 7 wherein said distance metric satisfies symmetry and positivity conditions.

9. The apparatus of claim 8 wherein said distance metric is selected from:

$$d_1(S, \Sigma) = \frac{A}{H} - 1, \quad d_5(S, \Sigma) = A + \frac{1}{H} - 2,$$

$$d_6(S, \Sigma) = \left(A + \frac{1}{H}\right)\left(G + \frac{1}{G}\right) - 4, \quad d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1, \quad d_9(S, \Sigma) = \frac{A}{G} + \frac{G}{H} - 2,$$

and fusion derivatives thereof.

10. The apparatus of claim 7 wherein said handset matrices are stored in a database of handset matrices wherein each handset matrix is derived from a unique make and model of handset.

11. The apparatus of claim 7 wherein said different speakers number ten or more.

12. The apparatus of claim 11 wherein the number of said different speakers is no less than twenty.

13. An automated handset identification system, comprising:

means for receiving a sample speech input signal from a sample handset;

means for deriving a cepstral covariance sample matrix from said first sample speech signal;

means for calculating, with a distance metric, all distances between said sample matrix and one or more cepstral covariance handset matrices, wherein each said handset matrix is derived from a plurality of speech signals taken from different speakers through the same handset; and means for determining if the smallest of said distances is below a predetermined threshold value.

14. The system of claim 13 wherein said means for receiving sample speech is in communication with an incoming line of communication.

15. The system of claim 14 wherein said incoming line of communication is a phone line.

* * * * *